(12) United States Patent
Shindou et al.

(10) Patent No.: US 9,388,878 B2
(45) Date of Patent: Jul. 12, 2016

(54) SUSPENSION DEVICE

(71) Applicant: KAYABA INDUSTRY CO., LTD., Tokyo (JP)

(72) Inventors: Kazuto Shindou, Gifu (JP); Hideaki Ogura, Gifu (JP)

(73) Assignee: KYB Corporation, Tokyo (JP)

(*) Notice: Subject to any disclaimer, the term of this patent is extended or adjusted under 35 U.S.C. 154(b) by 0 days.

(21) Appl. No.: 14/380,401

(22) PCT Filed: Mar. 5, 2013

(86) PCT No.: PCT/JP2013/055956
§ 371 (c)(1),
(2) Date: Aug. 22, 2014

(87) PCT Pub. No.: WO2013/133260
PCT Pub. Date: Sep. 12, 2013

(65) Prior Publication Data
US 2015/0054251 A1 Feb. 26, 2015

(30) Foreign Application Priority Data
Mar. 7, 2012 (JP) .................. 2012-050104

(51) Int. Cl.
| | | |
|---|---|---|
| *B62K 25/08* | (2006.01) | |
| *F16F 9/36* | (2006.01) | |
| *F16F 9/38* | (2006.01) | |
| *F16F 9/32* | (2006.01) | |

(52) U.S. Cl.
CPC .................. *F16F 9/368* (2013.01); *B62K 25/08* (2013.01); *F16F 9/3242* (2013.01); *F16F 9/38* (2013.01)

(58) Field of Classification Search
CPC ........ B62K 25/08; B62K 25/04; B62K 21/02; B62K 21/04
USPC ......................................................... 280/276
See application file for complete search history.

(56) References Cited

U.S. PATENT DOCUMENTS

| | | | | |
|---|---|---|---|---|
| 4,561,669 A | * | 12/1985 | Simons ................. | 280/276 |
| 5,328,196 A | * | 7/1994 | Ohma .................. | 280/276 |
| 5,346,236 A | * | 9/1994 | Ohma .................. | 280/276 |
| 5,359,910 A | * | 11/1994 | Chang et al. ......... | 74/551.2 |

(Continued)

FOREIGN PATENT DOCUMENTS

| | | |
|---|---|---|
| JP | H04-84941 U | 7/1992 |
| JP | 2002-274207 A | 9/2002 |

(Continued)

*Primary Examiner* — Kevin Hurley
*Assistant Examiner* — Michael Stabley
(74) *Attorney, Agent, or Firm* — Rabin & Berdo, P.C.

(57) ABSTRACT

A suspension device intervenes between a vehicle body and a wheel in a vehicle. The suspension device includes an outer tube coupled to the vehicle body, an inner tube inserted into the outer tube so as to allow the inner tube to advance and retreat, and a wheel-side bracket that includes a tubular holding portion into which an end portion on the wheel side of the inner tube is inserted and couples the inner tube to the wheel. The holding portion includes an annular ring disposed on the outer tube side and having an inner peripheral surface standing along an outer peripheral surface of the inner tube. The ring includes an outer peripheral tapered surface formed on an outer peripheral surface of the ring continuously from the end portion on the outer tube side of the inner peripheral surface and having a diameter gradually expanded to the holding portion side.

9 Claims, 5 Drawing Sheets

(56) References Cited

U.S. PATENT DOCUMENTS

| | | | |
|---|---|---|---|
| 5,449,188 A * | 9/1995 | Ohma | 280/276 |
| 5,472,221 A * | 12/1995 | Kameda et al. | 280/276 |
| 5,478,099 A * | 12/1995 | Kawahara | 280/276 |
| 5,829,773 A * | 11/1998 | Rajaee | 280/276 |
| 6,568,664 B2 * | 5/2003 | Furuya | 267/64.26 |
| 6,739,609 B2 * | 5/2004 | Miyabe | 280/276 |
| 6,997,293 B2 * | 2/2006 | Tomonaga et al. | 188/315 |
| 7,044,490 B2 * | 5/2006 | Ito et al. | 280/276 |
| 7,182,357 B2 * | 2/2007 | Czysz | 280/276 |
| 7,240,775 B2 * | 7/2007 | Nagai | 188/300 |
| 7,425,009 B2 * | 9/2008 | Namazue et al. | 280/279 |
| 7,766,138 B2 * | 8/2010 | Sintorn | 188/322.2 |
| 8,820,465 B2 * | 9/2014 | Ito et al. | 180/276 |
| 2011/0278084 A1 * | 11/2011 | Ito et al. | 180/219 |

FOREIGN PATENT DOCUMENTS

| | | |
|---|---|---|
| JP | 2009-254921 A | 11/2009 |
| JP | 2011-220494 A | 11/2011 |

* cited by examiner

SUSPENSION DEVICE

TECHNICAL FIELD

The present invention relates to improvement of a suspension device.

BACKGROUND ART

Generally, in transportation equipment such as an automobile and a motorcycle, a suspension device intervenes between the vehicle body and the wheel. This suspension device includes a suspension spring and a shock absorber. The suspension spring elastically supports the vehicle body and absorbs the shock due to the unevenness of the road surface. The shock absorber reduces the expansion and contraction motions in association with shock absorption. Accordingly, the suspension device reduces transmission of the shock due to the unevenness of the road surface to the vehicle body.

In a saddle-ride type vehicle such as a motorcycle, a suspension device intervening between the vehicle body and the front wheel is referred to as a front fork. JP04-84941A discloses a front fork that includes a suspension-device main body. The suspension-device main body includes an outer tube and an inner tube. The inner tube is inserted into the outer tube such that the inner tube can advance and retreat. In the suspension-device main body, a suspension spring and a shock absorber are housed.

Like JP04-84941A, in an inverted type front fork in which the outer tube is coupled to the vehicle body while the inner tube is coupled to the wheel, the inner tube is coupled to the axle of the front wheel via a wheel-side bracket.

The wheel-side bracket includes a tubular holding portion opened toward the vehicle body side. The end portion on the wheel side of the inner tube is inserted into this holding portion to be threadably mounted.

SUMMARY OF INVENTION

However, in the front fork in JP04-84941A, the end portion on the outer tube side of the holding portion is formed vertically to the center axis of the inner tube. Accordingly, in the case where the front fork is used under severe environment in which the front fork is covered by dirt, the dirt is likely to get on the end portion on the outer tube side of the holding portion but is unlikely to be dropped off. Then, when the front fork is vigorously compressed in the state where the dirt gets on the end portion on the outer tube side, there is a possibility that the dirt climbs over the dust seal and causes foreign matter contamination.

The present invention has been made in view of the above-described problem, and it is an object of the present invention to provide a suspension device that can prevent foreign matter contamination even in the case where the suspension device is used under severe environment in which the suspension device is covered by dirt.

According to one aspect of this invention, a suspension device intervening between a vehicle body and a wheel in a vehicle, includes: an outer tube coupled to the vehicle body; an inner tube inserted into the outer tube, so as to allow the inner tube to advance and retreat; and a wheel-side bracket that includes a tubular holding portion into which an end portion on the wheel side of the inner tube is inserted, the wheel-side bracket coupling the inner tube to the wheel. The holding portion includes an annular ring disposed on the outer tube side, the ring having an inner peripheral surface standing along an outer peripheral surface of the inner tube. The ring has an outer peripheral tapered surface formed on an outer peripheral surface of the ring continuously from an end portion on the outer tube side of the inner peripheral surface, the outer peripheral tapered surface having a diameter gradually expanded to the holding portion side.

The details as well as other features and advantages of this invention are set forth in the remainder of the specification and are shown in the accompanying drawings.

DESCRIPTION OF EMBODIMENTS

The following describes a suspension device 100 according to an embodiment of the present invention with reference to the drawings. Like reference numerals designate corresponding or identical components throughout the plurality of drawings.

Figure 1:
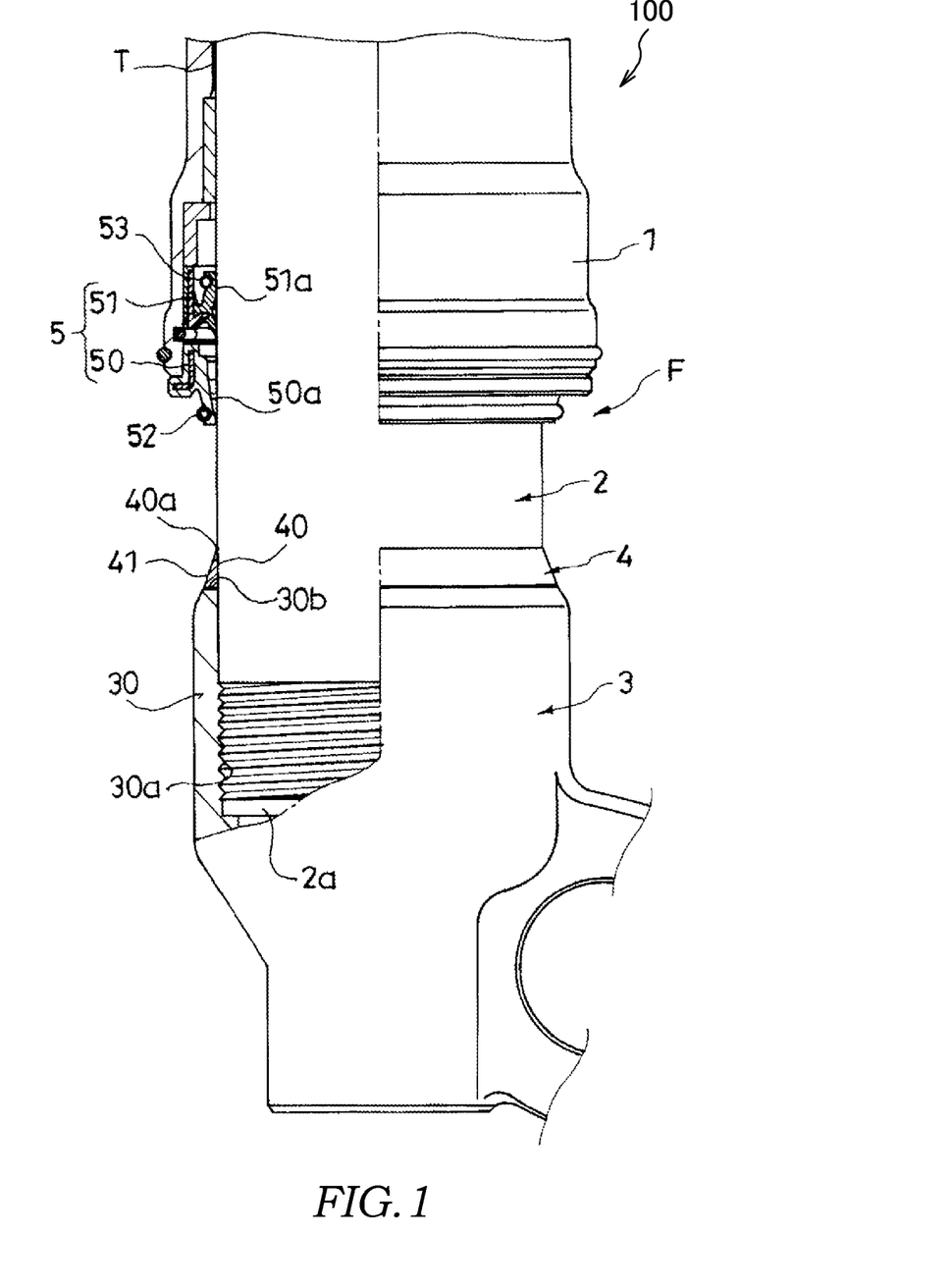
FIG. 1 is a partially cutaway front view illustrating a main portion of a suspension device according to an embodiment of the present invention.

The suspension device 100 intervenes between the vehicle body and the wheel in the vehicle. The suspension device 100 includes, as illustrated in FIG. 1, an outer tube 1, an inner tube 2, and a wheel-side bracket 3. The outer tube 1 is coupled to the vehicle body. The inner tube 2 is inserted into the outer tube 1 such that the inner tube 2 can advance and retreat. The wheel-side bracket 3 couples the inner tube 2 to the wheel. The wheel-side bracket 3 includes a tubular holding portion 30 into which an end portion 2a on the wheel side of the inner tube 2 is inserted.

In the suspension device 100, on the outer tube 1 side of the holding portion 30, an annular ring 4 is disposed. The ring 4 has an inner peripheral surface 40 standing along the outer peripheral surface of the inner tube 2. The ring 4 has an outer peripheral tapered surface 41 that is formed on the outer peripheral surface continuously from an end portion 40a on the outer tube 1 side of the inner peripheral surface 40 and has a diameter gradually expanded to the holding portion side.

Hereinafter, the detail will be described. In a saddle-ride type vehicle such as a motorcycle, the suspension device 100 is a front fork that suspends the front wheel of the saddle-ride type vehicle. While not illustrated, the suspension device 100 is an inverted type front fork in which the outer tube 1 is coupled to the steering shaft on the vehicle body side via the bracket on the vehicle body side while the inner tube 2 is coupled to the axle of the front wheel via the wheel-side bracket 3.

The outer tube 1 and the inner tube 2 constitute a suspension-device main body F. The opening of one end portion (the upper portion in FIG. 1) of the suspension-device main body F is obstructed by a cap member (not illustrated). On the other hand, the opening of the other end portion (the lower portion in FIG. 1) of the suspension-device main body F is obstructed by the wheel-side bracket 3. In the suspension-device main body F, the opening on the outer air side (the lower side in FIG. 1) of a tubular gap T is obstructed by a sealing member 5. The tubular gap T is formed in the overlapping portion between the outer tube 1 and the inner tube 2. Accordingly, the inside of the suspension-device main body F can be separated from the outer air side so as to seal the liquid or the gas within the suspension-device main body F.

The sealing member 5 is formed in a ring shape. The sealing member 5 is held at the inner periphery of the open end portion of the outer tube 1 while being slidably in contact with the outer peripheral surface of the inner tube 2. The sealing member 5 includes a dust seal 50 and an oil seal 51. The dust seal 50 is arranged on the outer air side (the lower side in FIG. 1). The oil seal 51 is arranged in series to the dust seal 50 on the opposite side (the upper side in FIG. 1) of the outer air side of the dust seal 50.

The dust seal 50 has a dust seal lip 50a whose inner diameter is reduced toward the outer air side. The dust seal lip 50a is formed to have a cross-section inclined toward the inner periphery at the outer air side. The distal end portion of the dust seal lip 50a is brought into pressure contact with the outer peripheral surface of the inner tube 2 by a garter spring 52 mounted on the outer periphery of the dust seal lip 50a.

The oil seal 51 has an oil seal lip 51a with an inner diameter reduced toward the opposite side of the outer air side. The oil seal lip 51a is formed to have a cross-section inclined toward the inner periphery at the opposite side of the outer air side. The distal end portion of the oil seal lip 51a is brought into pressure contact with the outer peripheral surface of the inner tube 2 by a garter spring 53 mounted on the outer periphery of the oil seal lip 51a.

The sealing member 5 causes the dust seal lip 50a to scrape off foreign matters attached to the outer peripheral surface of the inner tube 2. This can prevent sandwiching foreign matters on the inner peripheral surface of the oil seal lip 51a, the inner peripheral surface of the oil seal lip 51a from being scratched by foreign matters, and similar trouble. The sealing member 5 causes the oil seal lip 51a to scrape off the liquid attached to the outer peripheral surface of the inner tube 2, so as to prevent flow out of the liquid to the outer air side. Additionally, in the sealing member 5, the oil seal lip 51a is brought into sliding contact with the outer peripheral surface of the inner tube 2 via a liquid film, so as to seal the liquid or the gas within the suspension-device main body F. This can keep the air tightness of the suspension-device main body F.

The wheel-side bracket 3 obstructs the opening of the other end portion (the lower portion in FIG. 1) of the suspension-device main body F. The wheel-side bracket 3 couples the inner tube 2 to the axle of the front wheel. The wheel-side bracket 3 includes the holding portion 30 formed in a tubular shape. The end portion 2a on the wheel side of the inner tube 2 is inserted into the holding portion 30.

On the inner peripheral surface on the opposite side (the lower side in FIG. 1) of the outer tube 1 side of the holding portion 30, a screw groove 30a is formed. On the screw groove 30a, the inner tube 2 is threadably mounted. On the outer tube 1 side of the holding portion 30, an end portion 30b is formed vertically to the center axis of the inner tube 2.

In the end portion 30b on the outer tube 1 side of the holding portion 30, the annular ring 4 is placed. The ring 4 is formed by an elastic material such as rubber. The ring 4 is formed separately from the holding portion 30 and also separately from the wheel-side bracket 3.

The inner peripheral surface 40 of the ring 4 stands along the outer peripheral surface of the inner tube 2. The ring 4 has the outer peripheral tapered surface 41 that is formed on the outer peripheral surface continuously from the end portion 40a on the outer tube 1 side of the inner peripheral surface 40 and has a diameter gradually expanded to the holding portion side.

Figure 2:
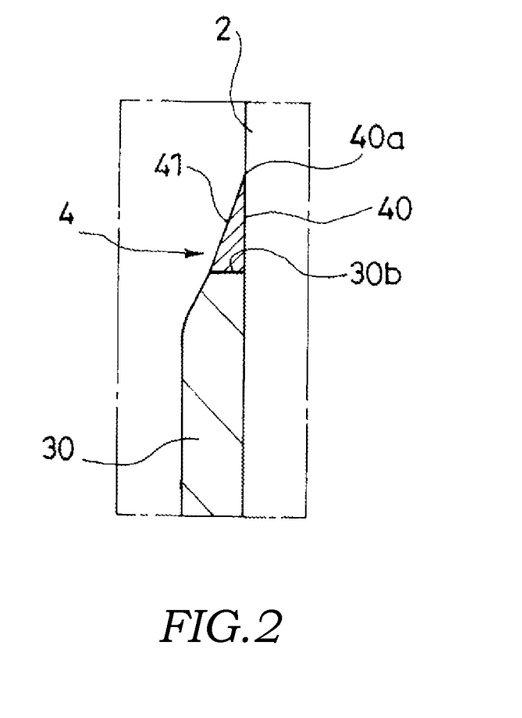
FIG. 2 is a partially enlarged view of FIG. 1.

As illustrated in FIG. 2, the outer peripheral tapered surface 41 is an inclined surface that has an outer diameter expanded from the end portion 40a on the outer tube 1 side of the inner peripheral surface 40 toward the end portion 30b of the holding portion 30. The outer peripheral tapered surface 41 is inclined to the outer periphery side from the end portion 40a toward the end portion 30b of the holding portion 30. The ring 4 is formed to have a cross-section in a triangular shape that includes the end portion 40a on the outer tube 1 side of the inner peripheral surface 40 as an apex.

The following describes the operation of the suspension device 100.

Figure 4:
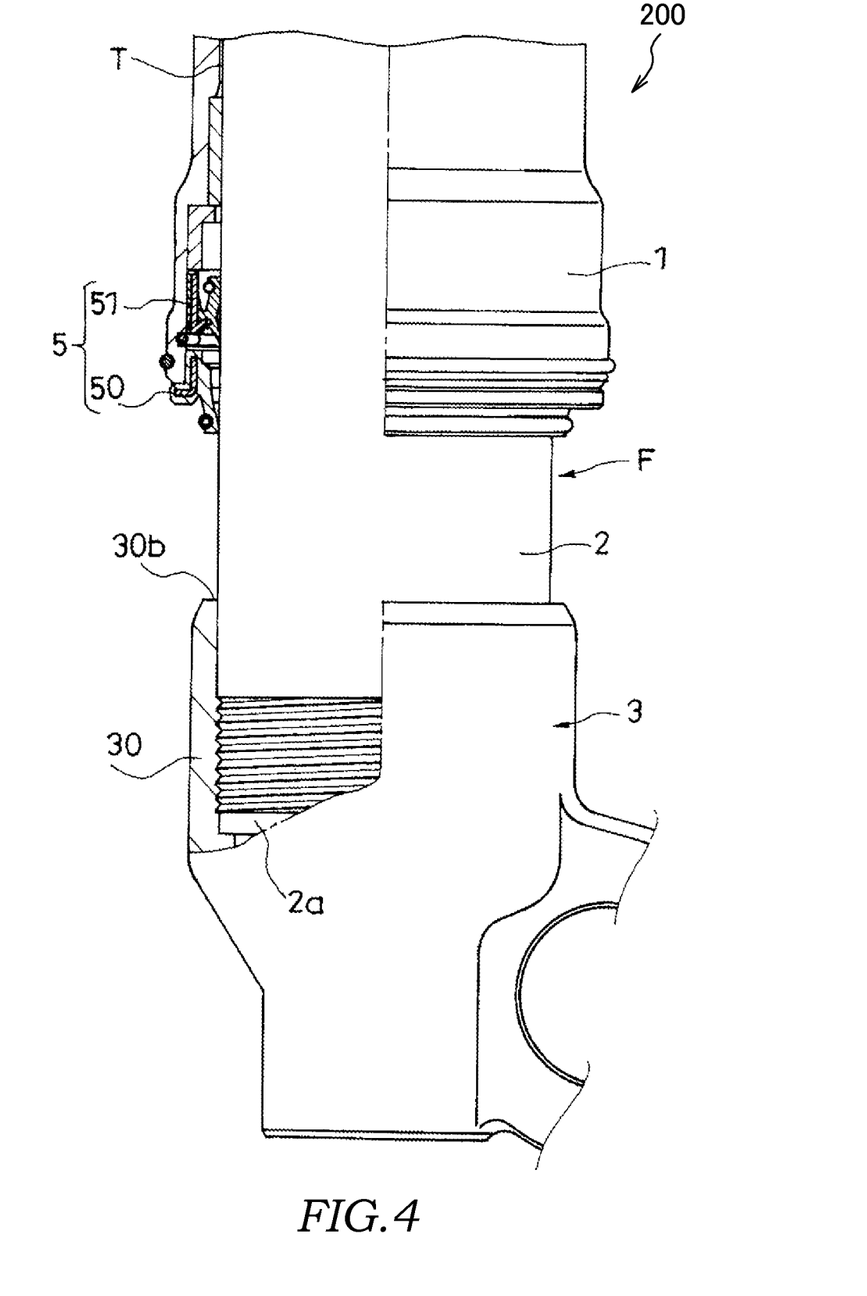
FIG. 4 is a partially cutaway front view illustrating a main portion of a suspension device according to a comparative example of the embodiment of the present invention.

Firstly, a description will be given of a suspension device 200 according to a comparative example of the present invention with reference to FIG. 4.

In the suspension device 200, a reservoir is disposed. The reservoir houses liquid or gas for volume compensation or temperature compensation of the shock absorber. In order to seal the liquid or the gas within the suspension-device main body F, the opening on the vehicle body side of the suspension-device main body F is obstructed by a cap member (not illustrated) while the opening on the wheel side is obstructed by the wheel-side bracket 3.

In the overlapping portion between the outer tube 1 and the inner tube 2, the tubular gap T is formed. The tubular gap T is obstructed by the annular sealing member 5 held at the inner periphery of the outer tube 1. The sealing member 5 includes the oil seal 51 and the dust seal 50. The oil seal 51 prevents flow out of the liquid or the gas in the suspension-device main body F to the outer air side. The dust seal 50 prevents mixing in of foreign matters in the suspension-device main body F.

In the inverted type front fork in which the outer tube 1 is coupled to the vehicle body while the inner tube 2 is coupled to the wheel, the inner tube 2 is coupled to the axle of the front wheel via the wheel-side bracket 3.

The wheel-side bracket 3 includes a tubular holding portion 30 opened toward the vehicle body side. To the holding portion 30, the end portion 2a on the wheel side of the inner tube 2 is inserted to be threadably mounted.

The end portion 30b on the outer tube 1 side of the holding portion 30 is formed vertically to the center axis of the inner tube 2. Accordingly, in the case where the front fork is used under severe environment in which the front fork is covered by dirt, the dirt is likely to get on the end portion 30b on the outer tube 1 side of the holding portion 30 but is unlikely to be dropped off. Then, when the front fork is vigorously compressed in the state where the dirt gets on the end portion 30b on the outer tube 1 side, there is a possibility that the dirt climbs over the dust seal 50 and causes foreign matter contamination.

In contrast, in the suspension device 100, the annular ring 4 is disposed on the outer tube 1 side of the holding portion 30. The inner peripheral surface 40 of the ring 4 stands along the outer peripheral surface of the inner tube 2. The ring 4 includes the outer peripheral tapered surface 41 that is formed on the outer peripheral surface continuously from the end portion 40a on the outer tube 1 side of the inner peripheral surface 40 and has the diameter gradually expanded to the holding portion side.

Accordingly, if the suspension device 100 is used under severe environment and the wheel-side bracket 3 is covered by dirt, the dirt is likely to slide off the outer peripheral tapered surface 41. This can prevent the dirt from getting on the holding portion 30. Accordingly, even in the case where the suspension device 100 is used under severe environment in which the suspension device 100 is covered by dirt, there is no possibility that the dust seal 50 runs upon the dirt accumulated on the holding portion 30 unlike the suspension device 200 according to the comparative example so as to prevent mixing in of foreign matters in the suspension-device main body F.

Additionally, in the suspension device 200 according to the comparative example, in the case where the inner tube 2 is decentered with respect to the wheel-side bracket 3, a gap occurs between the holding portion 30 and the inner tube 2. Accordingly, foreign matters such as dirt might be accumulated in the gap.

In contrast, in the suspension device 100, the ring 4 is formed separately from the wheel-side bracket 3 and separately from the holding portion 30. Accordingly, the inner peripheral surface 40 of the ring 4 can easily follow the outer peripheral surface of the inner tube 2 even in the case where the inner tube 2 is decentered with respect to the wheel-side bracket 3. Accordingly, this can prevent foreign matters such as dirt from being accumulated in the gap between the holding portion 30 and the inner tube 2.

In the case where the dirt is unlikely to slide off the outer peripheral tapered surface 41 due to deterioration of the ring 4 or the scratched outer peripheral tapered surface 41, only the ring 4 can be replaced.

In the suspension device 100, the ring 4 includes an elastic material. Accordingly, the ring 4 can be elastically deformed. Thus, the ring 4 can be replaced in a state where the wheel-side bracket 3 is mounted on the inner tube 2.

In the suspension device 100, the ring 4 is formed to have the cross-section in the triangular shape that includes the end portion 40a on the outer tube 1 side of the inner peripheral surface 40 as the apex. Accordingly, the outer peripheral tapered surface 41 smoothly communicates with the outer peripheral surface of the inner tube 2. This is highly effective to drop off dirt. Especially, the dirt is unlikely to be accumulated.

According to the embodiments described above, it is possible to obtain the following effects.

The suspension device 100 includes the ring 4. This can prevent the dirt from getting on the holding portion 30 so as to prevent foreign matter contamination even in the case where the suspension device 100 is used under severe environment in which the suspension device 100 is covered by dirt.

Embodiments of this invention were described above, but the above embodiments are merely examples of applications of this invention, and the technical scope of this invention is not limited to the specific constitutions of the above embodiments.

For example, the suspension device 100 according to the above-described embodiment is the front fork that suspends the front wheel in the saddle-ride type vehicle such as a motorcycle. The suspension device 100 is not limited to this. The suspension device 100 may be a rear cushion unit for the rear wheel in the saddle-ride type vehicle or a suspension device for different transportation equipment such as an automobile.

In the above-described embodiment, the ring 4 is formed by the elastic material such as a rubber. The material of the ring 4 is not limited to this, and can be selected as necessary.

It is preferred to perform a frictional-force reducing process on the outer peripheral tapered surface 41 of the ring 4 such that the dirt is likely to slide so as to reduce attachment of dirt. The ring 4 is formed separately from the holding portion 30. This ensures a high degree of freedom for designing the ring 4 and facilitates the surface treatment on the outer peripheral tapered surface 41.

The frictional-force reducing process can employ a well-known method as necessary. For example, paint for reducing the friction force may be applied over the outer peripheral tapered surface 41. Additionally, in the case where the ring 4 is formed of a hard material, the outer peripheral tapered surface 41 may be mirror-finished.

Figure 3A:
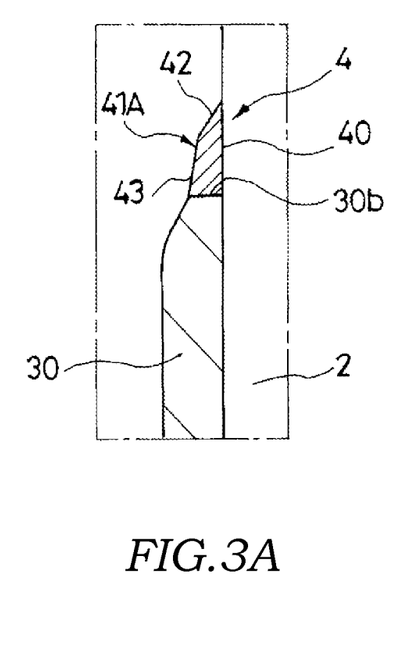
FIG. 3A illustrates a first modification of the suspension device according to the embodiment of the present invention, and is an enlarged view of a modified portion.
Figure 3B:
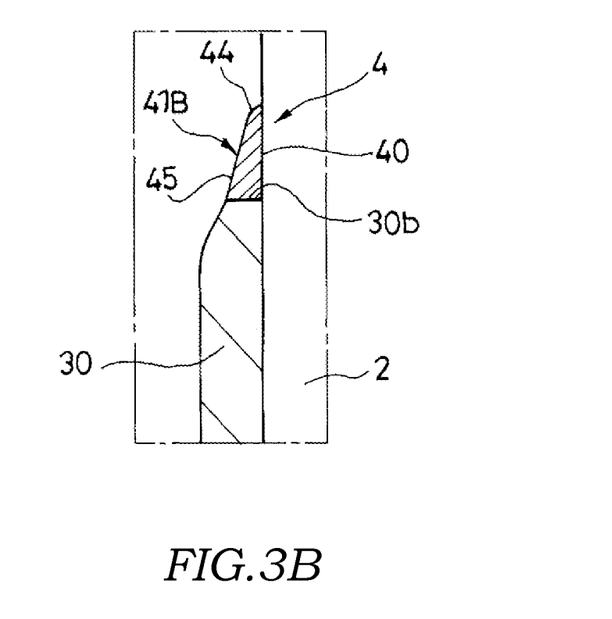
FIG. 3B illustrates a second modification of the suspension device according to the embodiment of the present invention, and is an enlarged view of a modified portion.

Also, the shape of the ring 4 is not limited to the above-described shape. For example, as illustrated in FIG. 3A, a tapered surface 41A formed on the outer peripheral surface of the ring 4 may include a plurality of inclined surfaces 42 and 43 with respective different inclination angles. As illustrated in FIG. 3B, a tapered surface 41B formed on the outer peripheral surface of the ring 4 may include a curved surface 44 and an inclined surface 45 that communicate with each other in the axial direction.

While in the above-described embodiments the ring 4 is formed separately from the holding portion 30, the ring 4 is not limited to this. The ring 4 may be formed integrally with the holding portion 30.

This application claims priority based on Japanese Patent Application No. 2012-050104 filed with the Japan Patent Office on Mar. 7, 2012, the entire contents of which are incorporated into this specification.

The embodiments of this invention in which an exclusive property or privilege is claimed are defined as follows:

The invention claimed is:

1. A suspension device intervening between a vehicle body and a wheel in a vehicle, comprising:
    an outer tube coupled to the vehicle body;
    an inner tube inserted into the outer tube, so as to allow the inner tube to advance and retreat; and
    a wheel-side bracket that includes a tubular holding portion into which an end portion on the wheel side of the inner tube is inserted, the wheel-side bracket coupling the inner tube to the wheel, wherein
    the holding portion includes an annular ring disposed on the outer tube side, the ring having an inner peripheral surface standing along an outer peripheral surface of the inner tube,
    the ring has an outer peripheral tapered surface formed on an outer peripheral surface of the ring continuously from an end portion as an apex on the outer tube side of the inner peripheral surface, the outer peripheral tapered surface having a diameter gradually expanded from the apex to the holding portion side,
    the ring is formed separately from the holding portion and placed in the holding portion, and
    the apex is in contact with the inner tube,
    the ring is attached to a portion of the holding portion so as to be immovable relative to the inner tube.

2. The suspension device according to claim 1, wherein the ring is formed by an elastic material.

3. The suspension device according to claim 1, wherein the ring is formed to have a cross-section in a triangular shape, the triangular shape including the end portion on the outer tube side of the inner peripheral surface as the apex.

4. The suspension device according to claim 1, wherein the apex is a point.

5. The suspension device according to claim 1, wherein the tapered surface forms an uppermost surface of the ring.

6. A suspension device intervening between a vehicle body and a wheel in a vehicle, comprising:
    an outer tube coupled to the vehicle body;
    an inner tube inserted into the outer tube, so as to allow the inner tube to advance and retreat;
    a wheel-side bracket that includes a tubular holding portion into which an end portion on the wheel side of the inner tube is inserted, the wheel-side bracket coupling the inner tube to the wheel; and
    an annular ring disposed on an outer tube side of the holding portion, the ring having an inner peripheral surface standing along an outer peripheral surface of the inner tube, the ring having an outer peripheral tapered surface extending from an end portion of the ring toward a holding portion side of the ring, the outer peripheral tapered surface having a diameter gradually expanded to the holding portion side of the ring, the ring being formed separately from the holding portion and placed in the holding portion, wherein a frictional-force reducing process is performed on the outer peripheral tapered surface.

7. A suspension device intervening between a vehicle body and a wheel in a vehicle, comprising:
 an outer tube coupled to the vehicle body;
 an inner tube inserted into the outer tube, so as to allow the inner tube to advance and retreat;
 a wheel-side bracket that includes a tubular holding portion into which an end portion, on a wheel side, of the inner tube is inserted, the wheel-side bracket coupling the inner tube to the wheel; and
 an annular ring disposed on an outer tube side of the holding portion, the ring having an inner peripheral surface standing along an outer peripheral surface of the inner tube, the ring having an outer peripheral tapered surface extending from an apex of the ring toward a holding portion side of the ring, the outer peripheral tapered surface having a diameter gradually expanded from the apex to the holding portion side of the ring, the ring being formed separately from the holding portion and placed in the holding portion, the apex being in contact with the inner tube, wherein the ring is attached to a portion of the holding portion so as to be immovable relative to the inner tube.

8. The suspension device according to claim 7, wherein the apex is a point.

9. The suspension device according to claim 7, wherein the tapered surface forms an uppermost surface of the ring.

* * * * *